(12) United States Patent
Suo et al.

(10) Patent No.: US 7,733,765 B2
(45) Date of Patent: Jun. 8, 2010

(54) METHOD FOR REALIZING FREQUENCY DOMAIN SCHEDULING IN THE TIME DIVISION DUPLEX SYSTEM AND THE SYSTEM THEREOF

(75) Inventors: Shiqiang Suo, Beijing (CN); Yingmin Wang, Beijing (CN); Qinling Xiong, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 115 days.

(21) Appl. No.: 12/281,574

(22) PCT Filed: Aug. 14, 2007

(86) PCT No.: PCT/CN2007/002452

§ 371 (c)(1),
(2), (4) Date: Sep. 3, 2006

(87) PCT Pub. No.: WO2008/019600

PCT Pub. Date: Feb. 21, 2008

(65) Prior Publication Data

US 2009/0052357 A1    Feb. 26, 2009

(30) Foreign Application Priority Data

Aug. 14, 2006  (CN) .................. 2006 1 0089269

(51) Int. Cl.
H04J 11/00 (2006.01)
H04J 1/16 (2006.01)
(52) U.S. Cl. ...................... 370/208; 370/252
(58) Field of Classification Search .......... 370/208, 370/252, 465
See application file for complete search history.

(56) References Cited

U.S. PATENT DOCUMENTS

| 2003/0073464 A1 | 4/2003 | Giannakis | |
| 2004/0192218 A1* | 9/2004 | Oprea | ............ 455/403 |
| 2005/0013352 A1* | 1/2005 | Hottinen | ............ 375/219 |

(Continued)

FOREIGN PATENT DOCUMENTS

| CN | 1703863 | 11/2005 |
| WO | 2006/019260 | 2/2006 |

*Primary Examiner*—Andrew Lee
(74) *Attorney, Agent, or Firm*—Hamre, Schumann, Mueller & Larson, P.C.

(57) ABSTRACT

A method and system for achieving frequency domain scheduling in a time division duplex system is disclosed, the method comprising: a first device transmits a non pre-coded reference symbol to a second device; from the reference symbol, the second device obtains a channel impulse response matrix experienced by the reference symbol transmitted from the first device, and according to the channel impulse response matrix, obtains linear spatial domain pre-coding matrix of candidate physical resource blocks used in transmitting data to the first device; from the channel impulse response matrix and the linear spatial domain pre-coding matrix, the second device obtains the channel quality indication of the candidate physical resource blocks; and performs the frequency domain scheduling according to the channel quality indication. The use of the method not only solves the problem in the prior art that the frequency domain scheduling is unable to be performed when a channel sounding method is employed, but also the contradiction in the use of the frequency domain scheduling and the linear spatial domain pre-coding. A communication system is also disclosed.

19 Claims, 4 Drawing Sheets

U.S. PATENT DOCUMENTS

| | | | |
|---|---|---|---|
| 2005/0111599 A1* | 5/2005 | Walton et al. | 375/347 |
| 2006/0029168 A1* | 2/2006 | Chuang et al. | 375/347 |
| 2007/0140374 A1* | 6/2007 | Raleigh et al. | 375/267 |
| 2007/0280367 A1* | 12/2007 | Nakao et al. | 370/343 |
| 2008/0037681 A1* | 2/2008 | Walton et al. | 375/267 |
| 2008/0187066 A1* | 8/2008 | Wang et al. | 375/267 |
| 2008/0304558 A1* | 12/2008 | Zhu et al. | 375/233 |
| 2008/0317158 A1* | 12/2008 | Ketchum et al. | 375/267 |
| 2009/0092087 A1* | 4/2009 | Walton et al. | 370/329 |
| 2010/0020757 A1* | 1/2010 | Walton et al. | 370/329 |

* cited by examiner

METHOD FOR REALIZING FREQUENCY DOMAIN SCHEDULING IN THE TIME DIVISION DUPLEX SYSTEM AND THE SYSTEM THEREOF

FIELD OF THE INVENTION

The present invention relates to orthogonal frequency division multiplexing (OFDM) technology in the field of communication, in particular to a method and apparatus for achieving frequency domain scheduling in a time division duplex system.

BACKGROUND OF THE INVENTION

In a time division duplex (TDD) communication system based on OFDM, frequency domain scheduling may be used to improve the communication performance of the system. Frequency domain scheduling refers to a method for fully using the frequency selectivity in a wideband communication system by selecting appropriate sub-band for the transmission of data of user terminals.

With reference to FIG. 1, there is shown a schematic view of the relative power of the sub-carriers received by different user terminals. Each sub-carrier received by a different user terminal will get different relative power when compared to the same reference value. The user 1 has higher relative power on the $30^{th}$ to $120^{th}$ sub-carriers, while the user 2 has higher relative power on the $120^{th}$ to $160^{th}$ sub-carriers as well as on the $240^{th}$ to $280^{th}$ sub-carriers. When resources are being allocated, the $30^{th}$ to $120^{th}$ sub-carriers will be allocated to user 1, and the $120^{th}$ to $160^{th}$ and the $240^{th}$ to $280^{th}$ sub-carriers will be allocated to user 2. Thus, each of the users always selects the sub-bands most suitable for transmission to transmit data, obtaining multi-user diversity gains. When there are a sufficient number of user terminals, a user terminal can always be found for any one of the sub-bands, and the sub-band will be allocated to the user to maximize the power of the sub-carrier, hence exploiting the communication capabilities of the wireless channel to the greatest extent.

In the TDD system, the linear spatial domain pre-coding/beam-forming technology may be used to improve the performance of the system. The linear spatial domain pre-coding refers to the technology that when there are multiple transmitting antennas at the transmitting end, the data flow is mapped through a linear pre-coding operation onto the multiple antennas so as to be transmitted.

With reference to FIG. 2, there is shown a schematic view of the linear spatial domain pre-coding operation. A total number of L data streams X are transformed through a pre-coder into corresponding signals Y to be transmitted on a total number of M antennas. The linear spatial domain pre-coding operation can be seen as a matrix operation, Y=VX, where V is the preceding matrix, the dimension of X is L×1, the dimension of Y is M×1, and the dimension of V is M×L. When L, i.e. the total number of the data stream is 1, the linear spatial domain pre-coding operation is beam-forming. The pre-coding matrix V is calculated from the channel impulse response matrix.

When a base station employs a manner which bases on the channel sounding to obtain a pre-coding matrix, the base station calculates the channel impulse response matrix according to the non pre-coded uplink reference symbol transmitted by the user terminal, and then calculates the linear pre-coding matrix according to the channel impulse response matrix. When such a manner is used, both the downlink reference symbol and the data symbol, which are transmitted to the user terminal by the base station, perform the linear spatial domain pre-coding process. The user terminal does not need to know the pre-coding matrix and does not need to estimate the channel response between each of the transmitting and receiving antennas, the user terminal only needs to estimate the equivalent channel response matrix, which is combined from the pre-coding matrix and the channel matrix, in order to demodulate the data symbols, thus effectively reducing the cost of the reference symbol of the transmitting terminal while supporting any type of pre-coding operation (including beam-forming). At the same time, such an implementation method can quickly track the channel response property in real-time while not approximating the calculated pre-coding matrix, hence having no pre-coding performance loss resulted from approximation. However, the user terminal using such a method can not calculate the indication of the channel quality according to the reference symbol after the pre-coding, resulting in loss of performance in the frequency domain scheduling of the system.

A base station of the prior art may also employ feedback-based manner to obtain a pre-coding matrix, wherein the information on the channel state and the pre-coding matrix are fed back by a user terminal. In such a method, the user terminal needs to feed back a large quantity of information, and the fed back information may be damaged and sometimes may be mistakenly transmitted, resulting in lower performance of the pre-coding/beam-forming of the system.

CONTENT OF THE INVENTION

The embodiment of the present invention provides a method and apparatus for achieving frequency domain scheduling in a time division duplex system, to solve the problem in the prior art that the frequency domain scheduling is unable to be performed when a channel sounding method is employed to obtain pre-coding matrix.

The embodiment of the present invention provides the technical schemes as follows:

A method for achieving frequency domain scheduling in a time division duplex system, comprising the steps of:

A first device transmits a non pre-coded reference symbol to a second device;

From the reference symbol, the second device obtains an impulse response matrix of the channel which is experienced by the reference transmitted from the first device; and from the channel impulse response the second device obtains linear spatial domain pre-coding matrix which will be used in the candidate physical resource blocks to transmit data to the first device;

From the channel impulse response matrix and the linear spatial domain pre-coding matrix, the second device obtains the channel quality indicator of the candidate physical resource blocks;

The frequency domain scheduling is performed according to the channel quality indicator.

A communication system, comprising:

A first device for transmitting a non pre-coded reference symbol;

A second device for obtaining an impulse response matrix of the channel experienced by the reference transmitted from the first device from the reference symbol, and obtaining the linear spatial domain pre-coding matrix used in the candidate physical resource block to transmit data to the first device from the channel impulse response matrix, and obtaining the channel quality indicator of the corresponding candidate physical resource block from the channel impulse response matrix and the linear spatial domain pre-coding matrix, and performing the frequency domain scheduling according to the channel quality indicator.

A communication system, comprising:

A first device for transmitting a non pre-coded reference symbol and performing frequency domain scheduling according to the channel quality indicator fed back by a second device;

A second device for obtaining an impulse response matrix of the channel experienced by the reference transmitted from the first device from the reference symbol, and obtaining the linear spatial domain pre-coding matrix used in the candidate physical resource block to transmit data to the first device from the channel impulse response matrix, and obtaining the channel quality indicator of the corresponding candidate physical resource block from the channel impulse response matrix and the linear spatial domain pre-coding matrix, and transmitting the channel quality indicator to the first device.

The present invention is advantageous, since

In the embodiment of the present invention the first device transmits a non pre-coded reference symbol to the second device; the second device obtains an impulse response matrix of the channel experienced by reference symbol transmitted from the first device from the reference symbol; from the channel impulse response matrix the second device obtains linear spatial domain pre-coding matrix used in the candidate physical resource block to transmit data to the first device; then obtains the channel quality indicator of the corresponding candidate physical resource block from the channel impulse response matrix and the linear spatial domain pre-coding matrix. The frequency domain scheduling is performed according to the channel quality indicator, while at the same time the linear spatial domain pre-coding can be performed according to the linear spatial domain pre-coding matrix calculated in the process of obtaining the channel quality indicator. Thus, the problem of the frequency domain scheduling being unable to be performed when employing the channel sounding technology is solved, while the contradiction between the frequency domain scheduling and the linear spatial domain pre-coding/beam-forming is also solved.

DETAILED DESCRIPTION OF THE INVENTION

In order to solve the problem in the prior art that the frequency domain scheduling is unable to be performed when a channel sounding method is employed to obtain pre-coding matrix, a user terminal is used in the embodiment to transmit a non pre-coded uplink reference symbol to a base station; the base station obtains a channel impulse response matrix from the reference symbol and calculates a linear spatial domain pre-coding matrix corresponding to each of the downlink physical resource blocks; the base station then obtains a channel quality indicator of the downlink physical resource blocks based on the channel impulse response matrix and the linear spatial domain pre-coding matrix so as to perform the frequency domain scheduling.

In the existing 3GPP EUTRA system, the downlink transmission employs the manner of OFDMA multi-access based on OFDM modulation technology, while the uplink transmission employs the manner of SC-FDMA multi-access. The OFDMA refers to an OFDM system which can distinguish a user in the time domain and the frequency domain simultaneously, i.e. a transmission system where the data of multiple users can either be transmitted at different time slots or at one same time slot, the signal of each of the users is generated in the frequency domain, corresponding to the data on several sub-carriers, and then be transformed through the inverse fast Fourier transform (IFFT) into the time domain in order to be processed and transmitted. The SC-FDMA system refers to a single carrier transmission system which can distinguish a user at the time domain and the frequency domain, i.e. a transmission system where the data of multiple users can either be transmitted at different time slots or at one same time slot, the signal of each of the users is generated firstly in the time domain, and then transformed into the frequency domain through discrete Fourier transform (DFT) to perform sub-carrier mapping operation, etc., and subsequently undergoes an IFFT to be processed and transmitted. For a 3GPP EUTRA system, OFDMA and SC-FDMA have different time slot structures.

Figure 1:
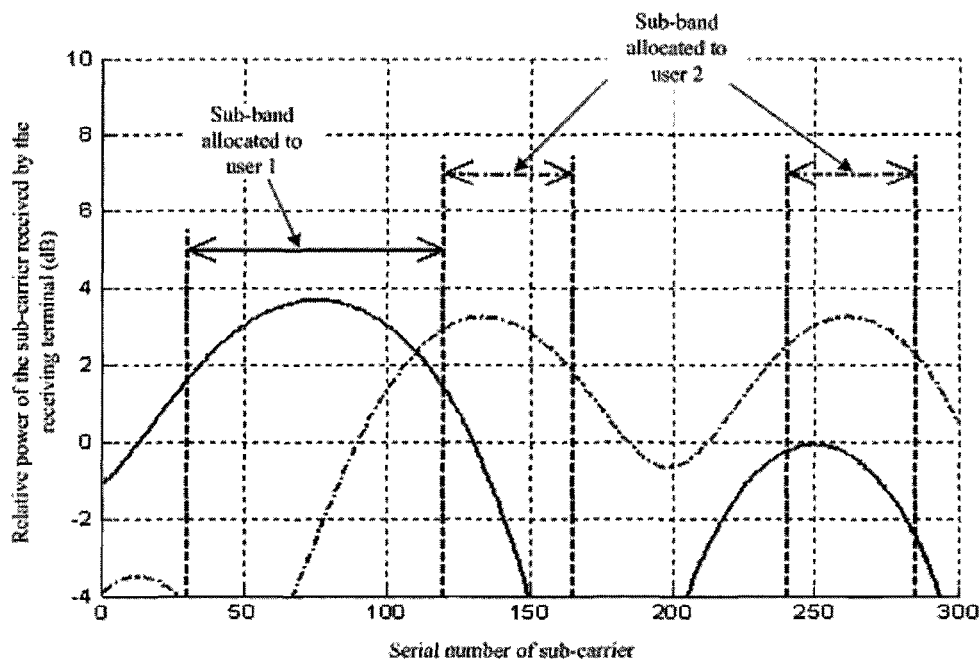
FIG. 1 is schematic view of the relative power of the sub-carriers received by the user at the receiving end in the prior art.
Figure 2:
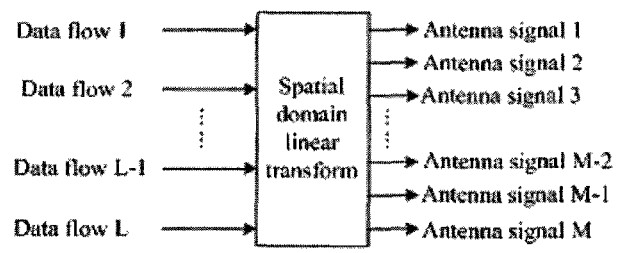
FIG. 2 is schematic view of the spatial domain linear pre-coding operation of the prior art.
Figure 3:
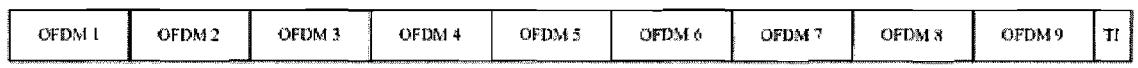
FIG. 3 is a schematic view of the structure of a time slot of the OFDMA in the embodiment of the present invention.

With reference to FIG. 3, there is shown a schematic view of the structure of a downlink transmission OFDMA time slot. A time slot consists of 9 OFDM symbols and one time interval (TI), wherein the time length of the TI can be 0.

Figure 4:
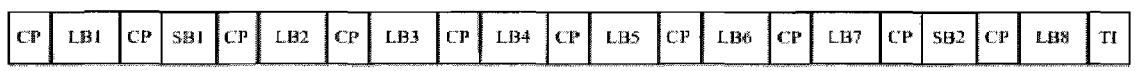
FIG. 4 is a schematic view of the structure of a time slot of the SC-FDMA in the embodiment of the present invention.

With reference to FIG. 4, there is shown a schematic view of the structure of an uplink SC-FDMA time slot. A time slot consists of 8 long blocks LB1-LB8, 2 short blocks SB1 and SB2, time interval TI and a cyclic prefix CP before each of the long blocks or the short blocks; wherein, the long blocks LB1-LB8 are used to carry service data, the short blocks SB1 and SB2 are used to carry uplink reference symbols, and the time length of the TI can be 0. In order to enable more of the uplink user terminals to transmit uplink reference symbols within the available frequency band range, the uplink reference symbols within the available frequency band range are distributed discretely on the frequency domain.

Figure 5:
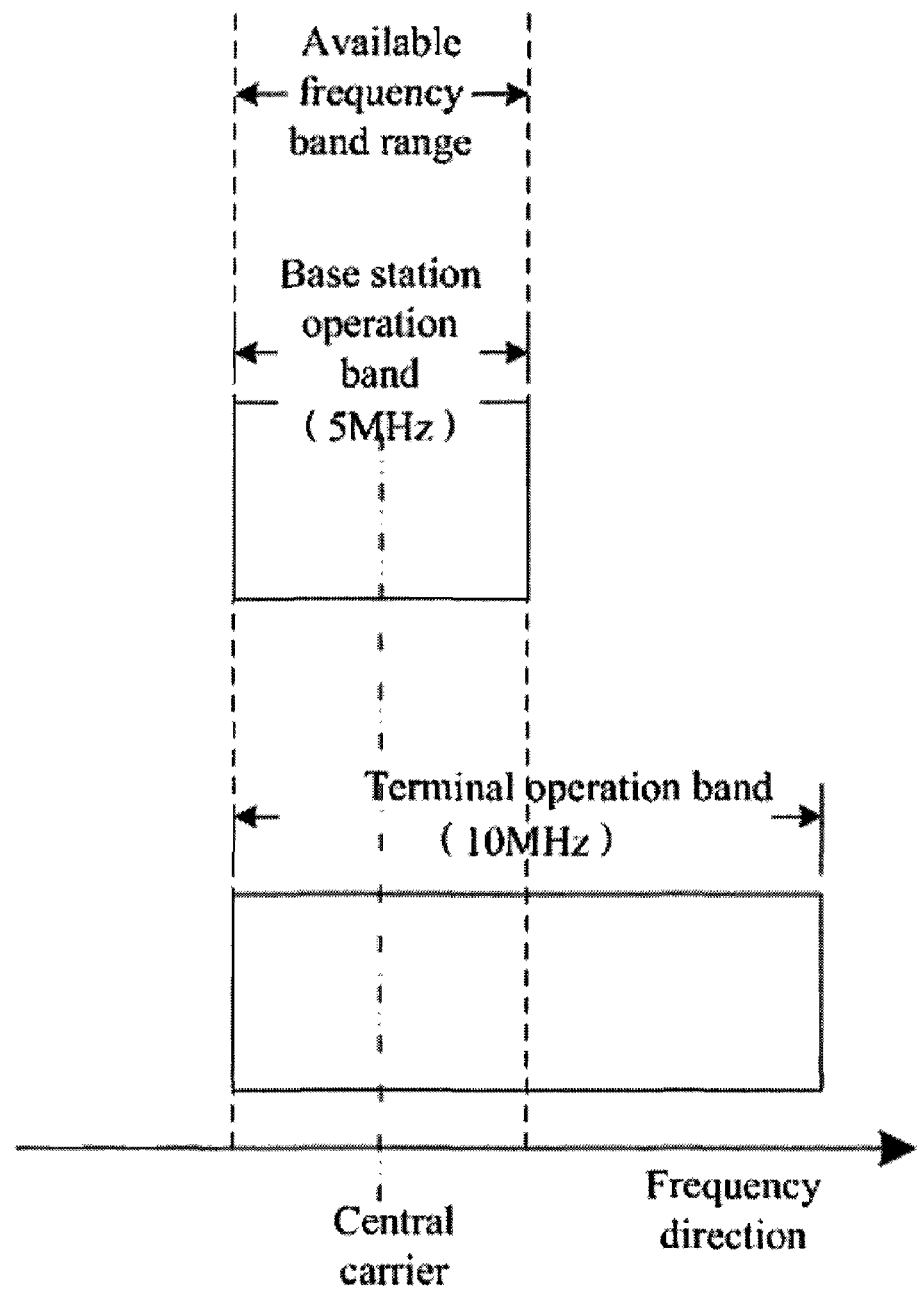
FIG. 5 is a schematic view of the frequency band range available to the user terminal in the embodiment of the present invention.

The available frequency band range refers to the frequency band range that can be used in the scheduling, that is the overlapping part of the terminal operation band width and the base station operation band width. A schematic view of the available frequency band range of the user terminal is shown in FIG. 5, wherein the terminal operation band width is 10 MHz, the base station operation band width is 5 MHz, the central carrier of the system is located at the center of 5 MHz and ¼ of 10 MHz, and the overlapping 5 MHz frequency band range is the available frequency band range of the system.

In order to avoid the collision between the uplink reference symbols transmitted by multiple user terminals, the system can allocate an available frequency band range to each of the user terminals, and each of the user terminals can only transmit uplink reference symbols within the available frequency band range. For example, when both of the operation band widths of the user terminal and the base station are 10 MHz, the whole operation band width is divided into two equal parts, with the magnitude of each part being 5 MHz, and the user terminal can only select one of the available frequency band ranges with the magnitude of 5 MHz to transmit uplink reference symbols. In practice, the magnitude of an available frequency band range for a user terminal may be dynamically or semi-statically adjusted according to the allocation of the uplink resources; if a large number of the uplink resources are not used in the uplink transmission and being idle, the user terminal may be allowed to transmit uplink reference symbols on the idle sub-carriers, thus expanding the available frequency band range.

In the TDD system, the whole operation band width is divided into several sub-bands basing on the frequency domain, each of the sub-bands consists of multiple successive sub-carriers; combined with the division over the time domain the physical resources of the system may be further divided.

For the downlink OFDMA, each of the transmission time slots in a sub-band is divided into multiple physical resource blocks (PRBs), each of the physical resource blocks is composed of M successive sub-carriers on all of the OFDM symbols in a transmission time slot, where the value of M is typically taken as 25; for the uplink SC-FDMA, a time slot is divided into multiple resource units (RUs), each of which being composed of N successive or discontinuous sub-carriers on all of the long blocks in a transmission time slot, where the value of N is typically taken as 25 as well.

Figure 6:
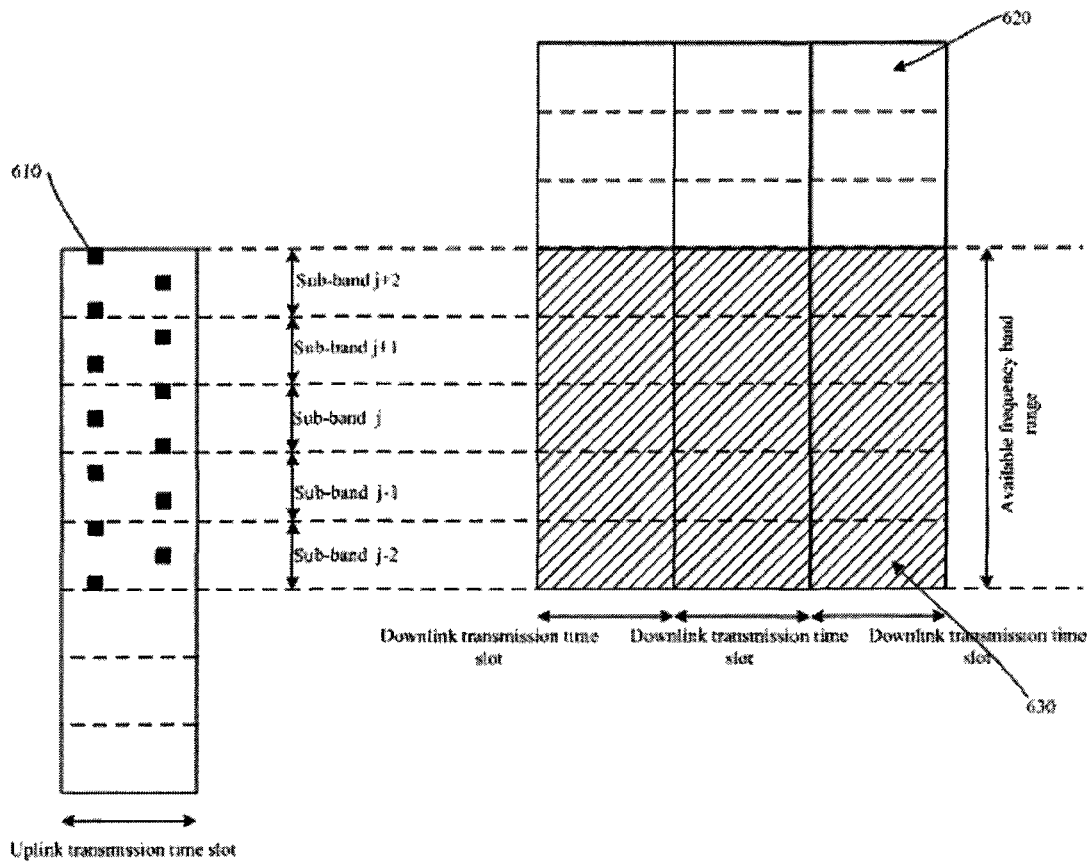
FIG. 6 is a schematic view of the division of the sub-bands in the embodiment of the present invention.

With reference to FIG. 6, there is shown a schematic view of the division of the frequency sub-band in the embodiment, illustrating the corresponding relationship between the non pre-coded uplink reference symbols and the downlink physical resource blocks on the sub-band, where 610 denotes the non pre-coded uplink reference symbol, 620 denotes the downlink physical resource blocks out of the available frequency band range, and 630 denotes the downlink physical resource blocks within the available frequency band range. The non pre-coded uplink reference symbol 610 is distributed discretely (in the frequency domain) on both the two short blocks (SB1 and SB2) in a time slot, or distributed discretely on one short block (SB1 or SB2) in a time slot or on a long block within the available frequency band range. Each of the sub-bands may correspond to multiple physical resource blocks in multiple downlink transmission time slots. After the user terminal has transmitted a non pre-coded uplink reference symbol within the available frequency band range, the base station may obtain, via the uplink channel sounding, the channel state information of the uplink on each of the sub-bands within the available frequency band range. Due to channel reciprocity in the TDD system, i.e. in the case where the channel state information changes relatively slowly with the time (for example, low speed movements), the channel state information of the uplink is identical with that of the downlink channel in the same sub-band. In this embodiment, the pre-coding matrix used on the downlink physical resource block is calculated according to the channel state information of the uplink, wherein an uplink reference symbol transmitted in an uplink time slot may correspond to the physical resource blocks in multiple downlink time slots.

Figure 7:
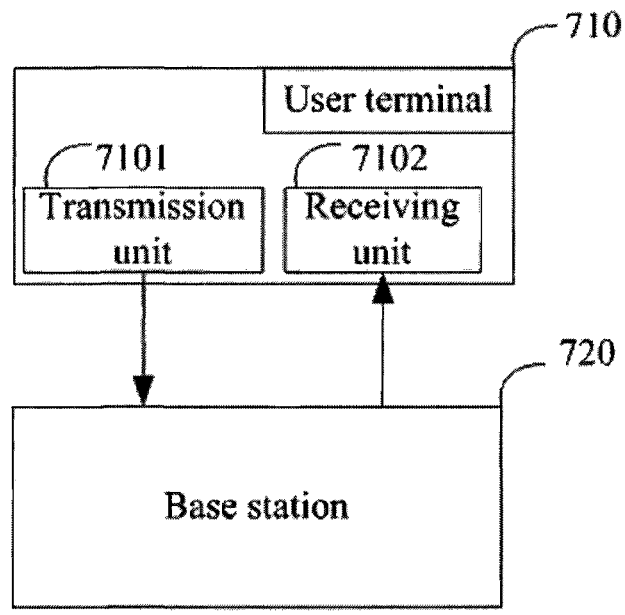
FIG. 7 is a schematic view of the structure of the system in the embodiment of the present invention.

With reference to FIG. 7, there is shown a schematic view of the structure of the system in the embodiment, which comprises user terminal 710 and base station 720. The user terminal 710 comprises a transmitting unit 7101 and a receiving unit 7102, wherein the transmitting unit 7101 is used for transmitting non pre-coded uplink reference symbols to the base station 720; the receiving unit 7102 is used for receiving data symbols and downlink reference symbols transmitted by the base station 720, the data symbols and the downlink reference symbols are linearly pre-coded by means of the pre-coding matrix. The base station 720 is used for performing the channel sounding from the non pre-coded uplink reference symbols transmitted by the user terminal 710, to obtain the channel state information of the uplink in order to perform the spatial domain linear pre-coding and the frequency domain scheduling in the downlink direction.

Figure 8:
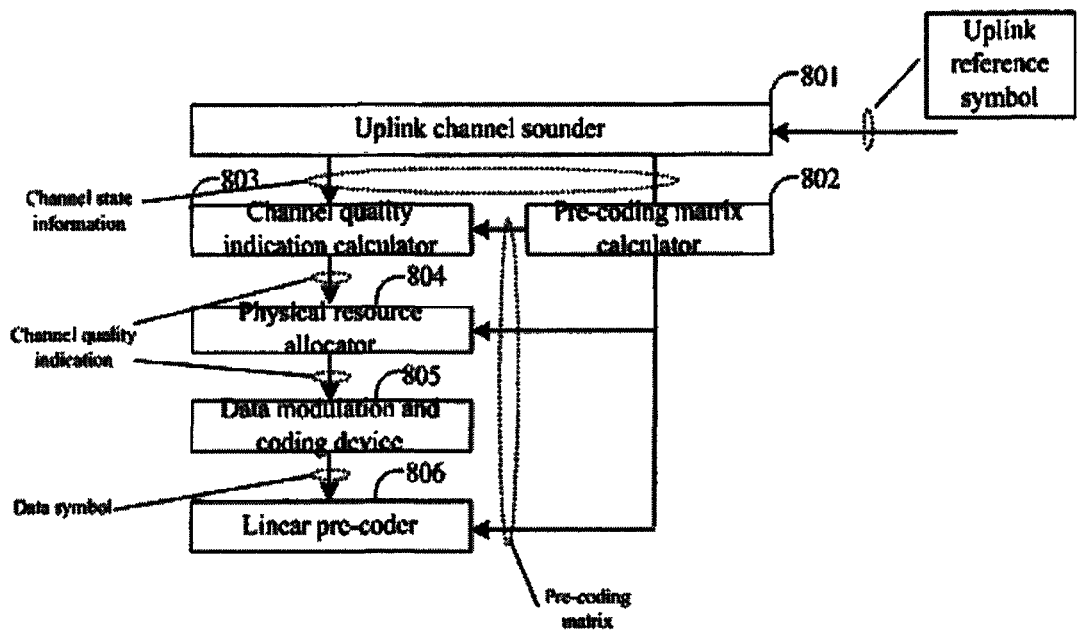
FIG. 8 is a schematic view of the structure of the base station-side processing apparatus in the embodiment of the present invention.

With reference to FIG. 8, there is shown a schematic view of the structure of the base station-side processing apparatus in the embodiment, which comprises an uplink channel sounder 801, a pre-coding matrix calculator 802, a channel quality indication calculator 803, a physical resource allocator 804, a data modulation and coding device 805, and a linear pre-coding device 806.

The uplink channel sounder 801 is used to obtain the uplink channel impulse response matrix on each of the sub-carriers of the user terminal 710 within the available frequency band range, based on the non pre-coded uplink reference symbol transmitted by the user terminal 710, and transmit the matrix to the pre-coding matrix calculator 802 and the channel quality indication calculator 803.

The pre-coding matrix calculator 802 is used to obtain the pre-coding matrix on each downlink physical resource block from the obtained uplink channel state information on each of the sub-carriers, and transmit the pre-coding matrix to the channel quality indication calculator 803, the physical resource allocator 804 and the linear pre-coding device 806.

The channel quality indication calculator 803 is used to obtain the channel quality indication on each downlink physical resource block from the obtained pre-coding matrix on each downlink physical resource block and the uplink channel impulse response matrix on each of the sub-carriers, and transmit the channel quality indication to the physical resource allocator 804.

The physical resource allocator 804 is used to allocate a downlink physical resource block to the user terminal 710, according to the magnitude of the data block expected to be transmitted by the user terminal 710 in the downlink direction and the obtained channel quality indication on each physical resource block, and transmit the information on the physical resource block and the corresponding channel quality indication to the data modulation and coding device 805.

The data modulation and coding device 805 is used to modulate and code the data bits to form data symbols according to the channel quality indication on each downlink physical resource block allocated to the user terminal 710, and transmit the data symbols to the linear pre-coding device 806.

The linear pre-coding device 806 is used to linearly pre-code both the data symbols on each downlink physical resource block and the corresponding reference symbols, according to the pre-coding matrix corresponding to each downlink physical resource block.

Figure 9:
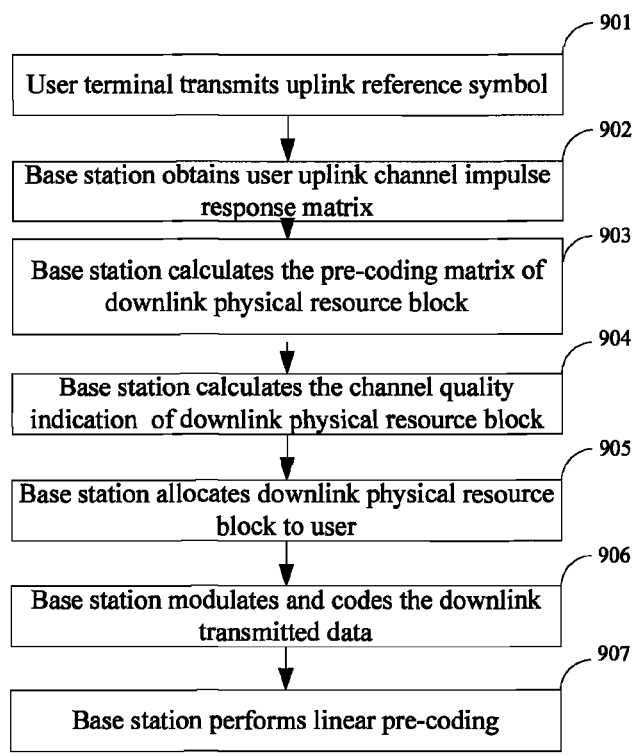
FIG. 9 is a flowchart of the process of performing linear spatial domain pre-coding and frequency domain scheduling in the embodiment of the present invention.

FIG. 9 is a flowchart of the process of linear spatial domain pre-coding and frequency domain scheduling in the embodiment, and the steps of the process are as follows:

Step 901: the user terminal transmits uplink reference symbols which cover the whole available frequency band range.

Step 902: the base station calculates the uplink channel impulse response matrix on each of the user terminal sub-carriers within the available frequency band range through the method of uplink channel sounding.

Step 903: the base station calculates the pre-coding matrix on each downlink physical resource block from the obtained uplink channel impulse response matrix on each of the sub-carriers.

Step 904: the base station calculates the channel quality indication on each downlink physical resource block, from the calculated pre-coding matrix on each downlink physical resource block and the calculated uplink channel impulse response matrix on each of the sub-carriers.

Step 905: the base station allocates the downlink physical resource blocks for the user terminal according to the magnitude of the data block expected to be transmitted by the user terminal in the downlink direction and the calculated channel quality indication on each downlink physical resource block.

Step 906: the base station modulates and codes the data bits transmitted in the downlink to form data symbols, according to the channel quality indication on each downlink physical resource block allocated to the user terminal.

When modulating and coding the data bits transmitted in the downlink, if there are multiple physical resource blocks allocated to the user terminal, the base station will firstly divide the data bits according to the channel quality indication corresponding to the physical resource blocks allocated to the user terminal; after the division is completed, the base station independently modulates and codes the data bits according to the modulation method and the coding rate corresponding to relevant channel quality indication on the physical resource blocks; if only one physical resource block is allocated to the user terminal, there will be no need to divide the data bits.

When dividing the data bits, the division may be conducted according to the proportion of the transmission block magnitude corresponding to each channel quality indication. For example, if the amount of the data transmitted by the user terminal is 1100 bits, the division proportion on the physical resource blocks 1 and 2 will be 600:540=10:9, and the data bits transmitted on the physical resource block 1 are 1100*10/19≈589 bits, while the data bits transmitted on the physical resource block 2 are 1100*9/19≈521 bits.

If the multiple physical resource blocks allocated to the same user terminal are successive on the frequency domain and/or the time domain, the data bits may be uniformly modulated and coded, and then allocated evenly to each physical resource block. At this time, an appropriate one of multiple channel quality indications corresponding to the physical resource blocks may be selected to determine the modulation and coding methods used in the uniform modulation and coding; it may also be possible to calculate a channel quality indication using the linear spatial domain pre-coding matrix corresponding to each physical resource block and the channel impulse response matrix on each sub-carrier in each physical resource block, and then use the channel quality indication to determine the method for modulation and coding.

Step 907: the base station performs linear spatial pre-coding on both the data symbol of each downlink physical resource block and the corresponding reference symbol, based on the linear spatial domain pre-coding matrix corresponding to each physical resource block.

When performing linear spatial domain pre-coding, the data symbol on each downlink physical resource block is transformed in a serial-parallel manner to form multiple data streams, then, after the respective reference symbol is interposed in each of the data streams, the signals to be transmitted on multiple antennas are generated through the corresponding linear spatial domain pre-coding matrix transform. If the multiple physical resource blocks allocated to the same user terminal are successive on the frequency domain and/or the time domain, for multiple data symbols and corresponding reference symbols transmitted parallel in each physical resource block, the pre-coding can be performed respectively using the linear spatial domain pre-coding matrix corresponding to every physical resource block; or the pre-coding may be performed using the average value of the linear spatial domain pre-coding matrix corresponding to each physical resource block; or based on the channel impulse response matrices on these physical resource blocks, newly calculate a linear spatial domain pre-coding matrix.

In the step 901, when the user terminal is transmitting the uplink reference symbols covering the whole available frequency band range, the data symbols can be transmitted together. For example, when using the short blocks in the uplink SC-FDMA time slots to transmit the uplink reference symbols, part of the uplink reference symbols are used to demodulate the uplink data symbols; or, taking advantage of the idleness during uplink data transmission, using the long blocks in the uplink SC-FDMA time slots to transmit independent uplink reference symbols, wherein the reference symbols are not used to demodulate the uplink data symbols. When the system uses two short blocks SB1 and SB2 to transmit uplink reference symbols, it is also possible for the uplink reference symbols carried by different short blocks to cover different frequency band ranges. For example, the available frequency band range can be divided into two parts, wherein the uplink reference symbols carried by SB1 may cover the first part of the available frequency band range, and the uplink reference symbols carried by SB2 may cover the second part of the available frequency band range.

In step 902, when the uplink user terminal uses one of the short blocks (SB1 or SB2) or a long block to transmit, within the available frequency band range, the uplink reference symbols discrete on the frequency domain, the base station obtains firstly the channel impulse response on the sub-carriers where the discrete point is located, and then obtains the uplink channel impulse response on each sub-carrier within the available frequency band range through frequency domain interpolation, thus completing the uplink channel detection.

When the uplink user terminal uses simultaneously the two short blocks (SB1 and SB2) to transmit, within the available frequency band range, the uplink reference symbols discrete in the frequency domain, if the uplink reference symbols carried by the two short blocks cover the same frequency band range (i.e. the whole available frequency band range is covered), the base station may select the uplink reference symbols carried by one of the two short blocks to perform the uplink channel sounding; or perform the uplink channel sounding using simultaneously the uplink reference symbols carried by the two short blocks, and then average the uplink channel impulse response corresponding to the two short blocks. If the uplink reference symbols carried by the two short blocks cover different frequency band ranges (i.e. each of them covers a part of the available frequency band range respectively), the uplink channel sounding may be performed within the corresponding frequency band range using respectively the uplink reference symbols carried by one of the two short blocks.

In the step 903, when calculating the linear pre-coding matrix, there are two cases in the channel state information of the uplink obtained through the channel impulse response matrix: A). the obtained channel state information of the uplink is adequate; B). the obtained channel state information of the uplink is inadequate. The two cases are described as follows.

A). the case where the obtained channel state information of the uplink is adequate:

If the channel state information is obtained through the mutually orthogonal non pre-coded reference symbols transmitted by multiple antennas in the uplink direction of the user terminal, the information is adequate. For example, the number of the transmitting antennas of the base station is M, the number of the receiving antennas of the terminal is K, if the reference symbol is transmitted by K antennas in the uplink direction and mutually orthogonal, and are received by M antennas, the dimension of the uplink channel impulse response matrix Gj obtained from the uplink reference symbol on each sub-carrier is M×K, where j is the serial number of the sub-carrier, i.e. adequate channel state information. Transmitting mutually orthogonal uplink reference symbols at different antennas can be achieved by transmitting on different sub-carriers. For example, in SB1, the uplink reference symbols at the antenna 1 are transmitted on sub-carriers 1, 6, 11 . . . , and the uplink reference symbols at the antenna 2 are transmitted on sub-carriers 2, 8, 12 . . . .

In the case where the obtained channel state information of the uplink is adequate, the uplink channel impulse response matrix Gj of different sub-carriers in a physical resource block needs to be averaged firstly in order to obtain a channel impulse response matrix $H_{DL}$ corresponding to the physical resource block, and then the pre-coding matrix is calculated from the channel impulse response matrix $H_{DL}$.

For example, when the number of the transmitting antennas of the base station is M, the number of the receiving antennas of the user terminal is K, the number of the data streams to be transmitted is L, an uplink channel impulse response $H_{UL}$ may be obtained through averaging the uplink channel impulse response matrix Gj of different sub-carriers, the dimension of $H_{UL}$ being M×K, thus, the corresponding downlink channel impulse should be $H_{DL}=H_{UL}^H$, the dimension of which being K×M, and a singular value decomposition (SVD) is performed on $H_{DL}$ to obtain that:

$$H_{DL}=U\Lambda V^H$$

where U is a unitary matrix with a dimension of K×K, i.e. $U^H U=I$, V is a unitary matrix with a dimension of M×M, i.e. $V^H V=I$, I denotes a unit matrix, superscript H denotes the conjugate transpose operation of the matrix, Λ consists of the singular values of channel matrix $H_{DL}$, with a dimension of K×M. Assume $\lambda_1 \geq \lambda_2 \geq \ldots \geq \lambda_{n_{min}}$ is the singular value of channel matrix $H_{DL}$, wherein $n_{min}=\min(M,N)$, then $$\Lambda = \begin{bmatrix} \lambda_1 & 0 & \cdots & 0 & 0 & \cdots & 0 \\ 0 & \lambda_2 & \cdots & 0 & 0 & \cdots & 0 \\ \vdots & \vdots & \ddots & \vdots & \vdots & \ddots & \vdots \\ 0 & 0 & \cdots & \lambda_K & 0 & \cdots & 0 \end{bmatrix} (K < M)$$

$$\Lambda = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_M \\ 0 & 0 & \cdots & 0 \\ \vdots & \vdots & \ddots & \vdots \\ 0 & 0 & \cdots & 0 \end{bmatrix} (K > M)$$

Wherein the number of the streams to be transmitted L≦min (M, K), then a total number of L maximum singular values can be selected in $\lambda_1 \geq \lambda_2 \geq \ldots \geq \lambda_{n_{min}}$, and L column vectors may be selected from the matrix V according to the location of each of the singular values in the matrix Λ, thus forming a pre-coding matrix V' with a dimension of M×L. If X denotes the data streams to be transmitted, Y denotes the signal on the transmitting antennas of the base station after being pre-coded, Z denotes the signal received by the user terminal, and N denotes the noise vector with a dimension of K×L, then, $$Z=HY+N=HV'X+N.$$

B. the case where the obtained channel state information of the uplink is inadequate:

If the state information of the channel is obtained through the reference symbols transmitted by one antenna in the uplink direction of the user terminal, or through identical reference symbols transmitted by multiple antennas, the channel state information is inadequate. For example, the number of the transmitting antennas of the base station is M, the number of the receiving antennas of the terminal is K, if the reference symbol is transmitted by one antenna in the uplink direction or repeatedly transmitted by K antennas, and is received by M antennas, the dimension of the uplink channel impulse response matrix Gj obtained from the uplink reference symbol on each sub-carrier is M×1, where j is the serial number of the sub-carrier, then the channel state information obtained by the base station is inadequate.

In the case where the obtained channel state information of the uplink is inadequate, the uplink channel impulse response matrix Gj of different sub-carriers in a physical resource block is averaged firstly to obtain an uplink channel impulse response matrix $H_{UL}$, thus, the downlink channel impulse response matrix corresponding to the physical resource block is $H_{DL}=H_{UL}^H$, then the pre-coding matrix is obtained using a method of transmitting beam-forming. For example, if the number of the data streams to be transmitted in the downlink direction is L, the pre-coding matrix may be expressed as:

$$V'=[v_1 x_2 \ldots v_L]$$

where $v_i$ denotes the pre-coded column vector corresponding to the $i^{th}$ data stream, and the pre-coded column vectors corresponding to each of the data streams are the same, that is $$V=[vv \ldots v]$$

where, v is obtained using a conventional beam-forming method or a maximum ratio beam-forming method, $v=H_{DL}^H$, or v may be obtained using a direction-based beam-forming method.

Since the manner of uplink transmission of the user terminal is decided by the base station, after receiving the uplink reference symbols transmitted by the user terminal, the base station estimates the manner of transmission of the received uplink reference symbols and determines whether the channel state information of the uplink is adequate or not, thereby determines the method for calculating the pre-coding matrix.

In step 904, the method for the base station to obtain the channel quality indication (CQI) on each of the downlink physical resource blocks, based on the pre-coding matrix V' on each of the downlink physical resource blocks and the uplink channel impulse response matrix Gj on each sub-carrier, is described as follows:

For every physical resource block, the equivalent channel matrix $(G_E)_j$ on each sub-carrier is calculated according to its pre-coding matrix V' as well as the uplink channel impulse response matrix Gj on each sub-carrier, where $(G_E)_j$ is a K×L matrix, L is the number the data streams before being linearly spatial pre-coded, K is the number of the antennas at the receiving end and j denotes the serial number of sub-carriers in a physical resource block, j=1 . . . J, where J is the total number of the sub-carriers in a physical resource block:

$$(G_E)_j = G_j^H V$$

For any one of the physical resource blocks, the signal-to-noise ratio $\gamma_j$ after the receiving of each of the sub-carriers in the downlink direction of the physical resource block is predicted using equivalent channel matrix. The receiving signal-to-noise ratio $\gamma_j$ is expressed as a function f1 of the equivalent channel matrix $(G_E)_j$ and the transmission signal-to-noise ratio (SNR), that is $$\gamma_j = f_1((G_E)_j, SNR), j=1 \ldots J.$$

The function f1 can be $$\gamma_j = \|(G_E)_j\|^2 \cdot SNR, j=1 \ldots J.$$

where $\|(G_E)_j\|$ denotes the 2-norm of the matrix $(G_E)_j$; the transmission signal-to-noise ratio SNR is calculated as the ratio between the transmission power $P_S$ on a physical resource block and the noise and/or interference power $P_N$ received by the user terminal on the physical resource block, i.e. $SNR = P_S/P_N$.

When the ratio between $P_S$ and $P_N$ is used to calculate the SNR, the downlink transmission power $P_S$ is the known transmission power of the base station, and the noise power is obtained through the measurement by the base station; the interference power is fed back to the base station after being measured by the user terminal; or approximate the downlink interference power as the uplink interference power, while the uplink interference power is obtained through measurement at the base station side, the uplink interference power is then used as the interference power in calculation; or alternatively the interference between the cells is approximated to no interference, i.e. the interference power is 0.

The SNR may also be obtained through predicting the downlink transmission SNR fed back uplink by the user terminal. When using the uplink feedback interference power to predict the SNR, the base station uses the ratio between the transmission power $P_S'$, which is used in transmitting to the user terminal for SNR measurement, and the transmission power $P_S$, which is used in the current transmission, to predict the SNR, that is $$SNR = \frac{P_S}{P_S'} SNR'$$

The equivalent signal-to-noise ratio $SIR_{eff}$ is calculated for every physical resource block based on the calculated receiving signal-to-noise ratio $\gamma$:

The equivalent signal-to-noise ratio $SIR_{eff}$ on a physical resource block is a function of the signal-to-noise ratio $\gamma$ on all of the sub-carriers within the physical resource block, that is:

$$SIR_{eff} = f(\gamma)$$

where, $\gamma$ denotes a collection of the signal-to-noise ratio $\gamma_j$ on all of the sub-carriers within the physical resource block.

A method for calculating equivalent signal-to-noise ratio $SIR_{eff}$ is employing the EESM (exponential effective SIR mapping) method, the functional relation of which is as follows:

$$SIR_{eff} = -\beta \ln\left(\frac{1}{J}\sum_{j=1}^{J} e^{-\frac{\gamma_j}{\beta}}\right)$$

where, J is the number of the sub-carriers within the physical resource block, $\beta$ is a parameter related to the modulation and coding method, where the parameter is determined through emulation. The values of parameter $\beta$ of an OFDMA system with the time slot structure of FIG. 3, with a time slot length of 0.675 ms and a sub-carrier interval of 15 kHz, are shown in Table 1:

TABLE 1

| Manner of Modulation | Coding Rate | β Value |
|---|---|---|
| QPSK | 1/3 | 1.14 |
| QPSK | 1/2 | 1.16 |
| QPSK | 2/3 | 1.26 |
| QPSK | 3/4 | 1.42 |
| 16 QAM | 1/2 | 2.8 |
| 16 QAM | 2/3 | 3.8 |
| 16 QAM | 4/5 | 5.56 |
| 64 QAM | 2/3 | 12.32 |
| 64 QAM | 3/4 | 15.54 |
| 64 QAM | 4/5 | 19.18 |

The CQI value corresponding to each of the physical resource blocks is obtained using the calculated equivalent signal-to-noise ratio $SIR_{eff}$ and a predetermined estimation threshold.

In practice, the frequency domain scheduling of a user terminal according to the CQI value is performed as follows:

For example, a service time slot is divided into 5 physical resource blocks, each being capable of supporting 16 modulation and coding grades, corresponding to 16 CQI values, respectively. The number of quadrature amplitude modulation (QAM) symbols that can be transmitted by a physical resource block is 150, the CQI that can be supported on each physical resource block and its corresponding estimation threshold, manner of modulation, coding rate and the transmit block size (TBS) are shown in Table 2:

TABLE 2

| CQI | Estimation Threshold (dB) | Modulation | Coding Rate | Transmit Block Size (bits) |
|---|---|---|---|---|
| 0 | $SIR_{eff} \leq -3$ | / | / | 0 |
| 1 | $-3 < SIR_{eff} \leq -1$ | QPSK | 1/4 | 45 |
| 2 | $-1 < SIR_{eff} \leq 0.5$ | QPSK | 1/3 | 100 |
| 3 | $0.5 < SIR_{eff} \leq 2$ | QPSK | 1/2 | 150 |
| 4 | $2 < SIR_{eff} \leq 3$ | QPSK | 2/3 | 200 |
| 5 | $3 < SIR_{eff} \leq 4$ | QPSK | 3/4 | 225 |
| 6 | $4 < SIR_{eff} \leq 5.5$ | 16 QAM | 1/2 | 300 |
| 7 | $5.5 < SIR_{eff} \leq 6.5$ | 16 QAM | 3/5 | 360 |
| 8 | $6.5 < SIR_{eff} \leq 8.5$ | 16 QAM | 2/3 | 400 |
| 9 | $8.5 < SIR_{eff} \leq 9$ | 16 QAM | 3/4 | 450 |
| 10 | $9 < SIR_{eff} \leq 10.5$ | 16 QAM | 4/5 | 480 |
| 11 | $10.5 < SIR_{eff} \leq 12$ | 64 QAM | 3/5 | 540 |
| 12 | $12.5 < SIR_{eff} \leq 13.5$ | 64 QAM | 2/3 | 600 |
| 13 | $13.5 < SIR_{eff} \leq 15$ | 64 QAM | 3/4 | 685 |
| 14 | $15 < SIR_{eff} \leq 18$ | 64 QAM | 4/5 | 820 |
| 15 | $18 < SIR_{eff}$ | 64 QAM | 5/6 | 850 |

When it is calculated that $SIR_{eff} = 5.4$ dB, according to Table 2 the index of CQI corresponding to the sub-band is 6. Thus, by calculating the equivalent signal-to-noise ratio $SIR_{eff}$ on each of the physical resource blocks of the user terminal, the channel quality indication on each of the downlink physical resource blocks of the user terminal can then be found according to Table 2.

If the calculated value of CQI on each of the downlink physical resource blocks of the user terminal is shown as in Table 3:

TABLE 3

| | Serial number of the physical resource block | | | | |
|---|---|---|---|---|---|
| | 1 | 2 | 3 | 4 | 5 |
| CQI | 12 | 11 | 9 | 8 | 5 |

When the amount of the data expected to be transmitted by the user terminal in the downlink direction is 1100 bits, according to the magnitude of the data blocks expected to be transmitted by the user terminal in the downlink direction, as well as the calculated channel quality indication on each of the physical resource blocks, allocate physical resource blocks 1 and 2 for the user; then select the linear spatial domain pre-coding matrix, which is corresponding to the downlink physical resource blocks 1 and 2, to perform linear spatial domain pre-coding for the data symbols and reference symbols transmitted downlink by the user terminal.

In this embodiment, the user terminal transmits an non pre-coded uplink reference symbol to the base station, the base station obtains the impulse response matrix of the channel according to the reference symbol and calculates the pre-coding matrix corresponding to each of the downlink physical resource blocks, and then obtains a channel quality indication of the downlink physical resource block in order to perform a frequency domain scheduling according to the channel impulse response matrix and the pre-coding matrix, while at the same time, performs the linear spatial domain pre-coding according to the calculated pre-coding matrix, thus solving the problem that the frequency domain scheduling is unable to be performed when the channel detection technology is employed, and avoiding the contradiction occurred in the simultaneous use of the frequency domain scheduling and the linear spatial domain pre-coding.

The embodiment of the present invention is not limited to what is described above. In another embodiment of the invention, the base station transmits a non pre-coded downlink reference symbol to the user terminal, the user terminal obtains the channel impulse response matrix from the reference symbol and calculates the pre-coding matrix corresponding to each of the uplink physical resource blocks, and then obtains a channel quality indication of the uplink physical resource block, and then feeds the channel quality indication back to the base station; the base station perform a frequency domain scheduling according to the channel quality indication. When such a method is employed, after obtaining downlink channel impulse response matrix and the pre-coding matrix according to the received non pre-coded downlink reference symbol, the user terminal side obtains equivalent channel matrix corresponding to every sub-carriers for each of the uplink physical resource blocks according to its pre-coding matrix and the downlink channel impulse response matrix on every sub-carrier, predicts the signal-to-noise ratio on each of the sub-carriers after receiving in the uplink direction according to the equivalent channel matrix and the transmission signal-to-noise ratio at the user terminal side, then determines the equivalent signal-to-noise ratio and determines corresponding channel quality indication according to the equivalent signal-to-noise ratio. The method of calculating channel quality indication at the user terminal side is similar to that in the embodiment described above and do not need to be described any further.

In the technical scheme of the embodiment, when there are multiple antennas at the base station, and only one antenna at the user terminal, the operation of the linear spatial domain pre-coding is degraded to the operation of transmitting beam-forming, in this case, the operation may only be performed in the downlink direction; when there is only one antenna at the base station, and multiple antennas at the terminal, the operation of the linear pre-coding is degraded to the operation of transmitting beam-forming, in this case, the operation may only be performed in the uplink direction.

It is obvious to those skilled in the art that various modifications and variations may be made to the present invention without departing from the spirits and scope of the invention. Thus, it is intended that all such modifications and variations are covered in the present invention if they fall within the scope of the claims and the equivalents thereof.

What is claimed is:

1. A method for achieving frequency domain scheduling in a time division duplex system, wherein the method comprising the steps of:
a first device transmits a non pre-coded reference symbol to a second device;
from the reference symbol, the second device obtains a channel impulse response matrix experienced by the reference transmitted from the first device, and from the channel impulse response matrix, obtains linear spatial domain pre-coding matrix used in the candidate physical resource blocks to transmit data to the first device;
from the channel impulse response matrix and the linear spatial domain pre-coding matrix, the second device obtains the channel quality indication of the candidate physical resource blocks;
the frequency domain scheduling is performed according to the channel quality indication.

2. The method of claim 1, wherein the frequency domain scheduling is performed by the second device according to the channel quality indication.

3. The method of claim 2, wherein the second device further allocates a physical resource block for the first device from the candidate physical resource blocks according to the amount of data transmitted to the first device, and uses the linear spatial domain pre-coding matrix corresponding to the allocated physical resource block to perform the linear spatial domain pre-coding.

4. The method of claim 3, wherein the second device modulates and codes the data bits transmitted to the first device to form a data symbol according to the channel quality indication corresponding to the physical resource block allocated to the first device, and uses the linear spatial domain pre-coding matrix corresponding to the allocated physical resource block to perform the linear spatial domain pre-coding on the data symbol and the corresponding reference symbol.

5. The method of claim 4, wherein when multiple physical resource blocks successive on the frequency domain and/or time domain are allocated to the first device, use the linear spatial domain pre-coding matrix corresponding to each allocated physical resource block respectively to perform the pre-coding on the data symbol and the reference symbol transmitted on this physical resource block; or average the linear spatial domain pre-coding matrix corresponding to each allocated physical resource block, and perform the pre-coding on the data symbol and the reference symbol according to the averaged pre-coding matrix.

6. The method of claim 1, wherein the second device transmits the channel quality indication to the first device, and the first device performs the frequency domain scheduling according to the channel quality indication.

7. The method of claim 1, wherein the channel impulse response matrix corresponding to each sub-carrier in a physical resource block calculated from the reference symbol is averaged, and the averaged channel impulse response matrix is conjugate transposed to the channel impulse response matrix of the corresponding physical resource block in order to obtain a linear spatial domain pre-coding matrix.

8. The method of claim 7, wherein when the channel impulse response matrix is obtained from the mutually orthogonal reference symbols transmitted by multiple antennas, singular value decomposition is performed on the averaged channel impulse response matrix to obtain a linear spatial domain pre-coding matrix.

9. The method of claim 7, wherein when the channel impulse response matrix is obtained, from either the reference symbol transmitted by one antenna or repeated reference symbols transmitted by multiple antennas, a beam-forming method is employed to obtain a linear spatial domain pre-coding matrix from the averaged channel impulse response matrix.

10. The method of claim 7, wherein the obtaining of the channel quality indication of the physical resource block comprising the steps of:
obtaining the equivalent channel matrix of each sub-carrier according to the linear spatial domain pre-coding matrix and the channel impulse response matrix corresponding to each sub-carrier in a physical resource block;
determining the receiving signal-to-noise ratio on each sub-carrier according to the equivalent channel matrix; and
obtaining the equivalent signal-to-noise ratio on the corresponding physical resource block according to the receiving signal-to-noise ratio of each sub-carrier, and determining the channel quality indication on the physical resource block according to the equivalent signal-to-noise ratio.

11. The method of claim 10, wherein the receiving signal-to-noise ratio of each sub-carrier is the product of the square of 2-norm of the equivalent channel matrix and the transmission signal-to-noise ratio.

12. The method of claim 11, wherein the transmission signal-to-noise ratio is the ratio between the transmission power at the second device side and the noise and/or interference power received at the first device side; or the transmission signal-to-noise ratio is the product of the ratio between the two transmission powers of the second device and the transmission signal-to-noise ratio of the first transmission power of the two transmission powers.

13. The method of claim 7, wherein the reference symbol and the data symbol are transmitted together; or the reference symbol is transmitted separately.

14. The method of claim 13, wherein the reference symbol is distributed discretely on an available frequency band.

15. The method of claim 13, wherein when there are two groups of the reference symbols, the two groups of the reference symbols cover different frequency band ranges.

16. A communication system, wherein the system comprising:
a first device for transmitting a non pre-coded reference symbol;
a second device for obtaining a channel impulse response matrix experienced by the reference symbol transmitted from the first device from the reference symbol, and for obtaining the linear spatial domain pre-coding matrix of the candidate physical resource block used in transmitting data to the first device from the channel impulse response matrix, and for obtaining the channel quality indication of the corresponding physical resource block from the channel impulse response matrix and the linear spatial domain pre-coding matrix, and for performing the frequency domain scheduling according to the channel quality indication.

17. The system of claim 16, wherein the second device comprising:
a unit for obtaining a channel impulse response matrix from a non pre-coded reference symbol;
a unit for obtaining a pre-coding matrix on the corresponding physical resource block from the channel impulse response matrix;
a unit for obtaining a channel quality indication on the corresponding physical resource block from the pre-coding matrix and the channel impulse response matrix;
a unit for allocating a physical resource block to the first device from the candidate physical resource blocks, according to the magnitude of the data block transmitted to the first device and the channel quality indication.

18. The system of claim 17, wherein the second device further comprising:
a unit for modulating and coding the data bits transmitted to the first device and forming a data symbol according to the channel quality indication corresponding to the physical resource block allocated to the first device;
a unit for performing the linear spatial domain pre-coding on the data symbol and the corresponding reference symbol, according to the linear spatial domain pre-coding matrix corresponding to the physical resource block allocated to the first device.

19. A communication system, wherein the system comprising:
a first device for transmitting a non pre-coded reference symbol and performing frequency domain scheduling according to the channel quality indication fed back by a second device;
a second device for obtaining a channel impulse response matrix experienced by the reference symbol transmitted from the first device from the reference symbol, and for obtaining the linear spatial domain pre-coding matrix of the candidate physical resource block used in transmitting data to the first device from the impulse response matrix, and for obtaining the channel quality indication of the corresponding candidate physical resource block from the channel impulse response matrix and the linear spatial domain pre-coding matrix, and for transmitting the channel quality indication to the first device.

* * * * *